(12) United States Patent
Nakanishi

(10) Patent No.: US 7,570,319 B2
(45) Date of Patent: Aug. 4, 2009

(54) LIQUID CRYSTAL DISPLAY

(75) Inventor: Kunifumi Nakanishi, Kikuchi-gun (JP)

(73) Assignee: Mitsubishi Denki Kabushiki Kaisha, Chiyoda-Ku, Tokyo (JP)

(*) Notice: Subject to any disclaimer, the term of this patent is extended or adjusted under 35 U.S.C. 154(b) by 598 days.

(21) Appl. No.: 11/033,544

(22) Filed: Jan. 12, 2005

(65) Prior Publication Data

US 2005/0212992 A1    Sep. 29, 2005

(30) Foreign Application Priority Data

Mar. 29, 2004   (JP) .............................. 2004-096537

(51) Int. Cl.
*G02F 1/1335*   (2006.01)
*G02F 1/1333*   (2006.01)

(52) U.S. Cl. .............................. 349/61; 349/69; 349/70; 349/106

(58) Field of Classification Search .................... 349/61, 349/69, 70, 106
See application file for complete search history.

(56) References Cited

U.S. PATENT DOCUMENTS

| | | | | |
|---|---|---|---|---|
| 4,238,793 A | * | 12/1980 | Hochstrate | .................. 345/102 |
| 5,555,160 A | * | 9/1996 | Tawara et al. | ................ 362/613 |
| 5,659,376 A | * | 8/1997 | Uehara et al. | .................. 349/58 |
| 5,757,447 A | * | 5/1998 | Kobayashi et al. | ............. 349/70 |
| 6,154,266 A | * | 11/2000 | Okamoto et al. | ............. 349/129 |
| 6,765,634 B2 | * | 7/2004 | Horibe et al. | .................. 349/70 |
| 2001/0030726 A1 | * | 10/2001 | Yoshida et al. | ............... 349/117 |
| 2003/0063062 A1 | * | 4/2003 | Tsumura et al. | ............. 345/102 |
| 2003/0184690 A1 | * | 10/2003 | Ogiwara et al. | ............... 349/61 |

FOREIGN PATENT DOCUMENTS

| | | |
|---|---|---|
| JP | 9-97017 | 4/1997 |
| JP | 2002-56812 | 2/2002 |
| JP | 2002-277870 | 9/2002 |
| JP | 2003-121838 | 4/2003 |

* cited by examiner

*Primary Examiner*—Michael H Caley
(74) *Attorney, Agent, or Firm*—Buchana Ingersoll & Rooney PC

(57) ABSTRACT

A primary object of the present invention is to provide a liquid crystal display device being capable of displaying an image with large color reappearance area and a genuine hue and chroma, while controlling a displacement of white chromaticity caused by changes of viewing angles. The device includes: a light source; a back light controlling a luminous intensity distribution from the light source; and a liquid crystal display panel controlling a transmission rate of light from the back light. The maximum intensity of a light emitting spectrum of the back light is in a range of 510 nm to 530 nm in a wavelength range of 500 nm to 550 nm, wherein the liquid crystal panel includes a red color filter transmitting red components, a green color filter transmitting green components and a blue color filter transmitting blue components, and a transmit spectrum of the green color filter includes a half value of a maximum transmitting rate of 500 nm to 590 nm in a wavelength range. The change of the transmit spectrum between viewing angle of 0° and 60° is within 20% from front direction in a wavelength range of 500 nm to 600 nm.

20 Claims, 12 Drawing Sheets

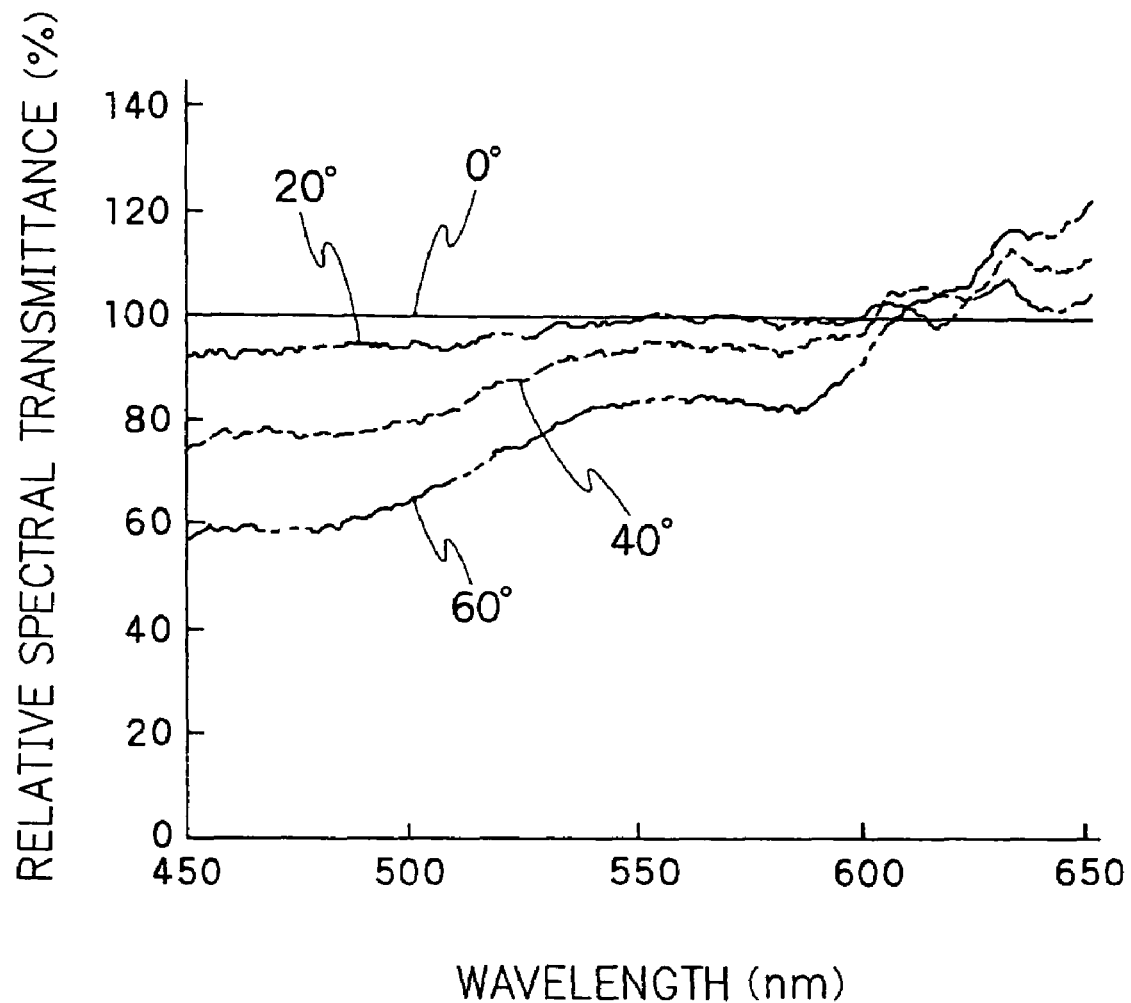

LIQUID CRYSTAL DISPLAY

BACKGROUND OF THE INVENTION

The present invention relates to a liquid crystal display comprising a liquid crystal display panel and a back light. More particularly, the present invention relates to the liquid crystal display which requires excellent color reappearance and visibility.

Recently, the liquid crystal display is used widely because of its advantages of lightness, thinness and low electric power usage, and replaces CRT which has been used.

FIG. 5 is a perspective view showing an arrangement of a general liquid crystal display. In FIG. 5, numeral 6 is a liquid crystal panel, numeral 7 is a back light unit. On the liquid crystal panel 6, there are provided a TFT element, lines and a TFT substrate 8 on which electrodes are formed, and a counter substrate 9 having a color filter on glass and aligned parallel and a liquid crystal 10 therebetween. An area 11 in the liquid crystal panel 6 is composed of a plurality of pixels, and each pixel comprising subpixel which transmits wavelength areas of red, green and blue. Light emitted by a light source 12 irradiates the whole surface of the liquid crystal panel 6 by the back light unit 7, and transmits through subpixel having a transmissivity corresponding to the transmissivity of a picture to be displayed, then observed by an observer.

Of characteristic of a displayed picture on the liquid crystal display, a color characteristic is generally expressed by a CIE chromaticity coordinates adapted by Commission Internationale de l'Eclairage. In the CIE chromaticity coordinates, a coordinate axis (x, y) showing two-dimensional chromaticity information is obtained from 3 stimulus values of X, Y and Z, derived from a value calculated by an integral calculus of a wave length range of visible light after multiplying a spectrum of an object to be targeted by a spectral sensitivity of human eyes. FIG. 6 shows the CIE chromaticity coordinates. In FIG. 6, a horseshoe shaped area 13 shows a range of visible light, and in this range, red is shown near by right bottom, green is upper part and blue is near left bottom. When a position Pr is a monochromatic red color in the color coordinate system, Pg is a monochromatic green color in the color coordinate system and Pb is a monochromatic blue color in the color coordinate system, a color reappearance area in which the liquid crystal display can display which is a domain represented the straight lines connecting three points, Pr-Pg-Pb, becomes a chromaticity in the color coordinate system as shown in an area 14.

The color characteristic of the liquid crystal display explained above is mainly determined by a combination of a characteristic of a light emitting spectrum of the back light and a characteristic of a transmit spectrum of the liquid crystal display. The characteristic of the transmit spectrum is usually determined by the characteristic of the transmit spectrum of a liquid crystal layer and the transmit spectrum of the color filter.

Numeral 15 in FIG. 7 shows a characteristic of the light emitting spectrum of a conventional back light of the liquid crystal display. With respect to the light source of the back light, a cold cathode tube is employed, and with respect to a fluorescent material, white-colored three wavelength fluorescent materials which is a mixture of a blue light emission, a green light emission and a red light emission, is employed. Therefore, the light emitting spectrum of the back light has three peaks, however, since the fluorescent material has the light emitting spectrum in the wavelength other than a main wavelength, the fluorescent material has peaks in areas between blue and green and in an area between green and red. Numerals 16, 17 and 18 in FIG. 7 show transmit spectrums of a conventional color filter. As shown in this figure, positions of the peak wavelength of the back light and positions of the transmit spectrum of a high transmit wavelength of the color filter generally coincide inside areas of blue, green and red. Numeral 19 in FIG. 8, the CIE chromaticity presents an input-output example of the color reappearance area. FIG. 7 also shows a color reappearance area 20 adapted by NTSC (National Television System Committee). In general, as a numerical value presenting the area of color reappearance of the display system, an area ratio for the color reappearance area 20 being adapted by NTCS is employed, and the value is called as Gamut. An example shown in 20, Gamut=50(%).

On the other hand, a Gamut value is about 72% for the conventional CRT, and its value is larger than the Gamut value of the conventional liquid crystal display. Recently, a demand for the liquid crystal display system becomes higher for TVs, and the color reappearance area for the liquid crystal display has been required to be high as the area of CRT. Therefore, in order to meet this requirement, the color filter has been improved. Numerals 21, 22 and 23 in FIG. 9 show the characteristic of the transmit spectrum of the color filter being developed for a purpose of obtaining a larger color reappearance area. In this spectrum characteristic, since layers of red area, green area and blue area become small, the color purity of each color, red, green and blue is improved, and possible display area of the color reappearance becomes larger. Numeral 24 in FIG. 8 shows the color reappearance area of the light emitting spectrum obtained from the color filter and a general back light. The Gamut value of this crystal display device is 72% and obtained the same level as the color reappearance area of a CRT.

Also in recent years, a requirement for the large color reappearance area for the liquid crystal display becomes even higher for a use of digital cameras and digital video cameras.

In accordance with Japanese Unexamined Patent Publication No. 97017/1997, through employing a white light source spectrum having a wavelength range which does not reach the peak at 470 nm to 510 nm and a wavelength range of 560 nm to 600 nm, the color purity becomes higher through eliminating unnecessary wavelength elements which locate near 490 nm for blue, near 490 nm and 580 nm for green.

In accordance with Japanese Unexamined Patent Publication No. 56812/2002, with respect to a light emitting source, an enlargement of the color reappearance area has been achieved by either eliminating or minimizing a side light emitting peak of a green fluorescent or reducing a band width of the light emitting spectrum of a blue fluorescent.

Furthermore, in accordance with Japanese Unexamined Patent Publication No. 277870/2002, within a range of wave length in which a spectral transmittance of a blue-colored filter layer is overlapped with that of green or a spectral transmittance of green-colored filter layer is overlapped with that of red, the enlargement of the color reappearance area has been achieved by not having a sub peak, which is different from a maximum peak in the light emitting spectrum of the fluorescent light source.

As mentioned above, in order to obtain the large color reappearance area for the conventional liquid crystal display, there has been primarily provided such a technique as to delete components other than a principal wavelength or set a right wavelength range of the light emitting spectrum for a fluorescent material of a fluorescent lamp. These methods emphasize an improvement of color purity of each color of red, green and blue through reducing the interference of each color, and does not mention about the hue itself.

However, as the liquid crystal display, the hue of each color of red, green and blue gives a large influence on clearness of a displayed picture, hence it is important. For example, as shown in above-mentioned Japanese Unexamined Patent Publication No. 97017/1997, when a proposed light source having the spectrum characteristic is employed, a position of the green chromaticity coordinates can be read as (0.28, 0.62) in FIG. 6, and (0.26, 0.64) in FIG. 8. However, these green colors are not genuine green colors, but within a range of so-called yellow green, and these hues are not sufficient to display a genuine green image.

Also, in accordance with Embodiment 1 of Japanese Unexamined Patent Publication No. 56812/2002, a position in the chromaticity coordinate system for a green color is (0.282, 0.645), and in accordance with Embodiment 2, a position in a chromaticity coordinates for a green color is (0.261, 0.642), therefore, both colors have yellow green hues. In addition, in Japanese Unexamined Patent Publication No. 277870/2002, there is no description about a specific wavelength of the light source spectrum, and there is no regulation of the hue of each color.

As mentioned above, the color characteristic of a displayed picture of the liquid crystal display is mainly obtained by the combination of the light emitting spectrum of the back light, the characteristic of the transmit spectrum of a liquid crystal layer and the characteristic of the liquid crystal layer of the color filter. However, as the prior art as mentioned above, either only the back light or the characteristics of the back light and the color filter is mentioned, and a characteristic of a spectrum of the display panel with a crystal layer is not mentioned. FIG. 10 shows the transmit spectrum of a general twist nematic (TN) type of the liquid crystal panel. As shown in FIG. 10, the characteristic of a spectrum is not flat for the wavelength range of the visible light, and it has a complicated characteristic. Therefore, in order to consider the color characteristic of the liquid crystal display, the characteristic of a transmit spectrum of the liquid crystal panel is essential.

In general, the liquid crystal display has a problem in a change of chromaticity and luminance when a direction of a viewing angle of a displayed picture is changed. As FIG. 11 shows, this occurs because the characteristic of the transmit spectrum on the crystal display changes widely by the viewing angle. An angle in FIG. 11 represents the viewing angle by left and right polar angles as a normal direction of 0° on the liquid crystal display panel. FIG. 12 shows a standardized spectrum from a front direction derived from the transmit spectrum of each angular direction of FIG. 11. On a low wavelength side, a change at a viewing angle of 60° is relatively more than 40% compared with a change at a front direction. Therefore, it is important to consider the characteristic of the liquid crystal panel in terms of having a good display picture when viewing angle is changed, in addition to an observation of the liquid crystal panel from the front direction.

An object of the present invention is to provide the liquid crystal display being capable of showing a genuine hue and chroma with a large picture of the color reappearance area, while controlling a variation of white trichromatic from a change of viewing angle.

SUMMARY OF THE INVENTION

In accordance with a liquid crystal panel of the present invention, there is provided a liquid crystal display device including, a light source, a back light controlling a luminous intensity distribution from the light source and a liquid crystal display including liquid crystal display panel, wherein the liquid crystal panel is provided in a light emitting side and controls a transmission rate from the back light, wherein a maximum intensity of a light emitting spectrum of back light is in a range of 510 nm to 530 nm in a wavelength range of 500 nm to 550 nm, wherein liquid crystal panel includes a red color filter, which transmits red components, a green color filter, which transmits green components and a blue color filter, which transmits blue components, and a transmit spectrum of green color filter includes a half value of a maximum transmitting rate of 500 nm to 590 nm in a wavelength range.

Furthermore, the liquid crystal display panel has a relative change of the transmit spectrum within 20% from front direction, between a viewing angle of 0° and 60° in a wavelength range of 500 nm to 600 nm.

According to the present invention, since a maximum intensity of a light emitting spectrum of a back light is in a range of 510 nm to 530 nm in a wavelength range of 500 nm to 550 nm, a half value range of maximum transmitting rate for the transmitting spectrum of the green color filter is in a wavelength range of 500 nm to 590 nm, and a change of transmitting spectrum at 0° to 60° in a wavelength range of 500 nm to 600 nm of a liquid crystal display panel is relatively within 20% compared with front direction. Therefore, it is possible to display an image with large color reappearance area and a genuine green color with respect to a hue and chroma while controlling a displacement of white chromaticity caused by a change of viewing angle.

BRIEF DESCRIPTION OF THE DRAWINGS

FIG. 12 shows a standardized transmit spectrum from each viewing angle of a front spectrum in FIG. 2.

DETAILED DESCRIPTION

Embodiment 1

Figure 1:
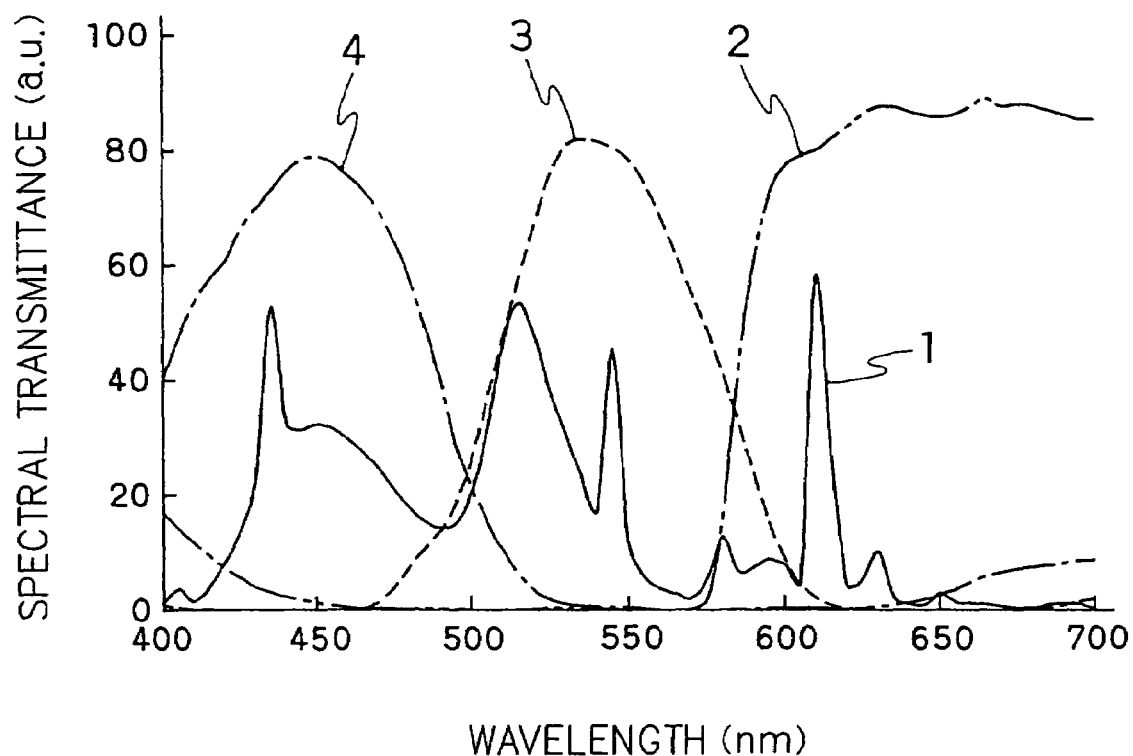
FIG. 1 shows a characteristic diagram of a light emitting spectrum of a back light and a transmit spectrum of a color filter, which consist a liquid crystal display in accordance with Embodiment 1 of the present invention.
Figure 10:
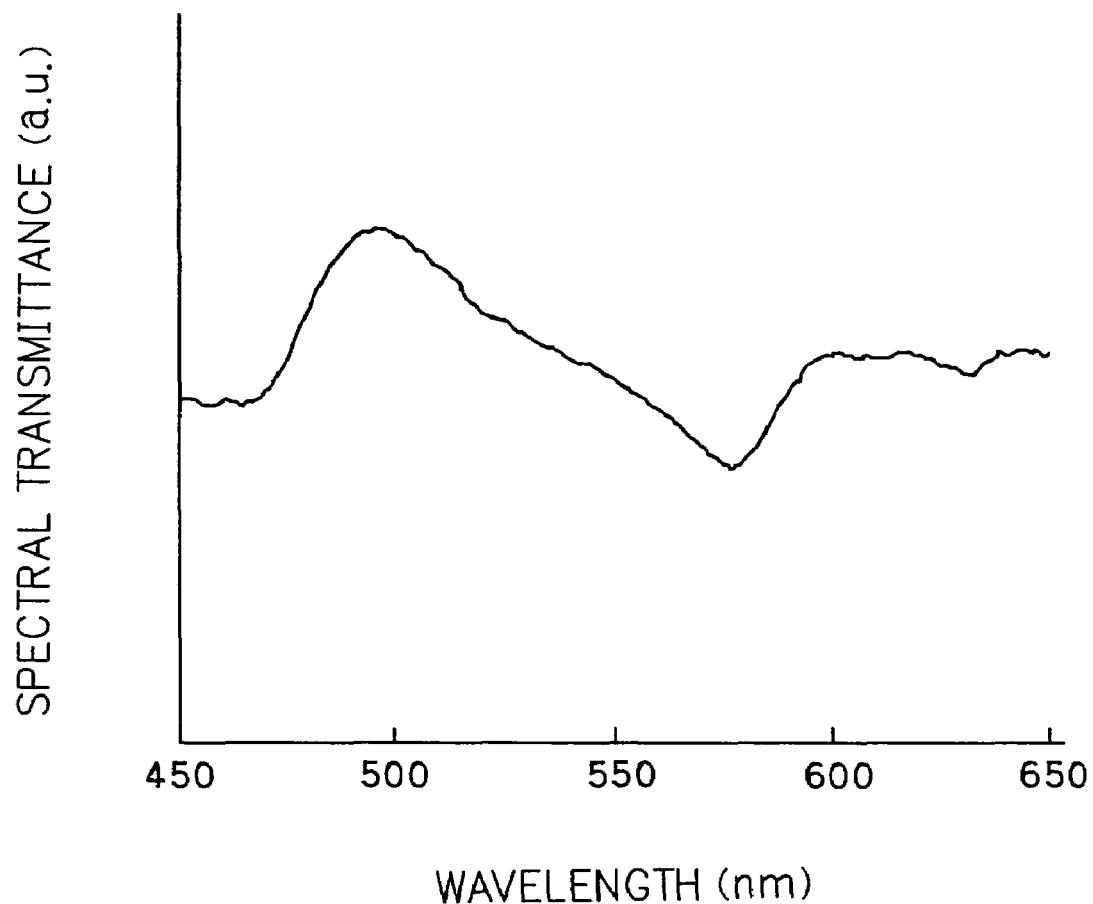
FIG. 10 shows a characteristic diagram of the transmit spectrum for a general twist nematic liquid crystal panel.
Figure 11:
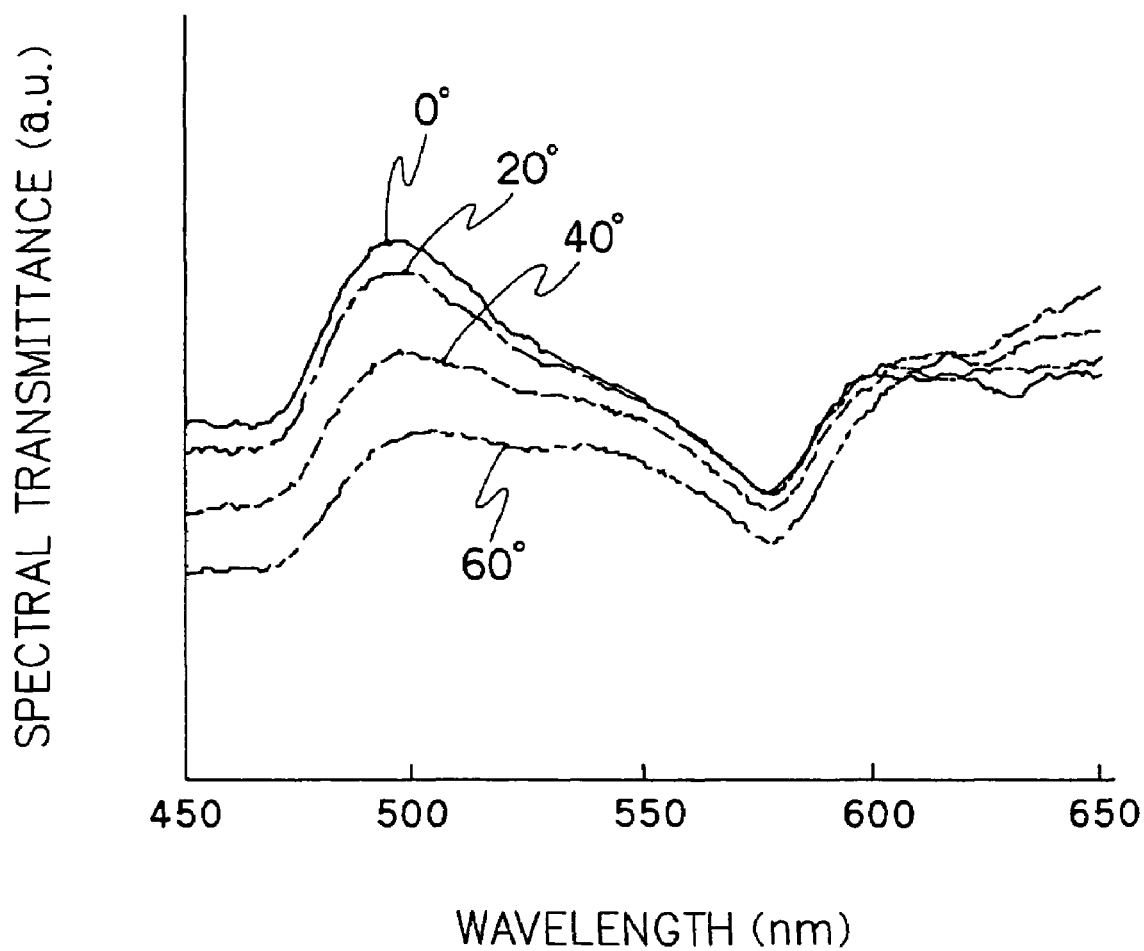
FIG. 11 shows a characteristic diagram of a dependent viewing angle of the general twist nematic liquid crystal panel.

FIG. 1 shows the characteristic of the light emitting spectrum of a back light BL1 and the characteristic of the transmit spectrum 1 of a color filter CF1 in Embodiment 1. The characteristic of the transmit spectrum is composed of a transmit spectrum 2 of a red color filter, a transmit spectrum 3 of a green color filter and a transmit spectrum 4 of a blue color filter. In Embodiment 1, with respect to a light source for the back light, a cold cathode fluorescent light having a maximum intensity of the light emitting spectrum around 517 nm in a light emitting spectrum range of 500 nm to 550 nm in an area of a green component is employed. On the other hand, a maximum transmission rate of the transmit spectrum of the green color filter 3 is placed around 535 nm, and a wavelength range having a transmission rate of larger than a half value is in a range of 508 nm to 585 nm. For a liquid crystal panel, a general TN-type liquid crystal having the characteristic of the transmit spectrum is employed as shown in FIG. 10.

Figure 9:
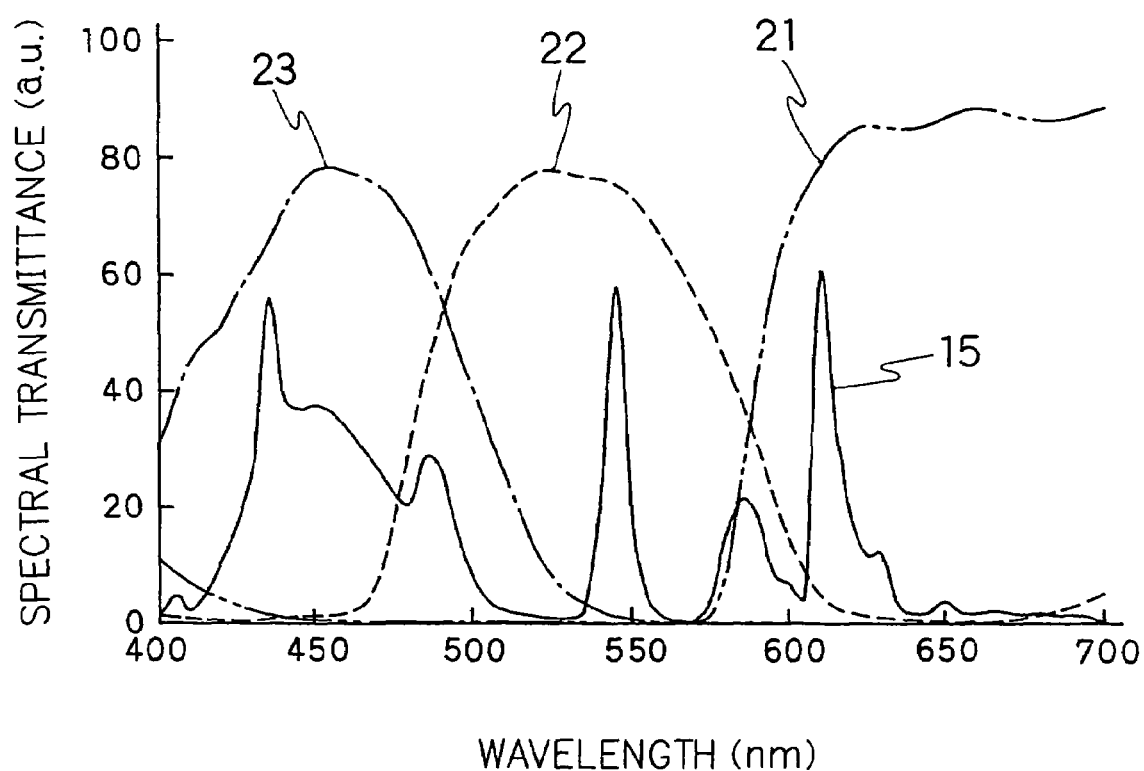
FIG. 9 shows a characteristic diagram of the light emitting spectrum of the back light and the transmit spectrum of the color filter in order to attain a larger color reappearance area for the conventional liquid crystal display.

In Table 1, there is shown a test result of a chromatic coordinates of a displayed green picture, a color reappearance area and a chromaticity displacement of a white chromaticity with respect to the arranement C of a liquid crystal display device including the back light BL1, color filter CF1 and TN-type liquid crystal panel. In Table 1, the chromaticity displacement of the white chromaticity caused by changes of viewing angle denotes a color difference, du'v', which is the chromaticy displacement of the white chromaticity caused by horizontal movements of viewing angle of 20°, 40° and 60° against a front direction. Also, in Table 1, there are shown the chromatic coordinates of a displayed green picture, a range of color reappearance and a test result of a chromatically displacement of a white chromatically caused by change of a viewing angle for a conventional back light shown in FIG. 9, with respect to an arrangement A with a conventional back light and conventional color filter and an arrangement B with the back light BL1 and conventional color filter.

TABLE 1

| Arrangement | Backlight | Color filter | Liquid crystal mode | Green chromatic coordinates | | Color reappearance area Gamut | Change of white chromaticity by viewing angle [du'v'] | | |
|---|---|---|---|---|---|---|---|---|---|
| | | | | x | y | | 20° | 40° | 60° |
| A | conventional | conventional | TN | 0.280 | 0.618 | 72% | 0.006 | 0.020 | 0.031 |
| B | BL1 | conventional | TN | 0.206 | 0.648 | 87% | 0.008 | 0.024 | 0.038 |
| C | BL1 | CF1 | TN | 0.207 | 0.712 | 96% | 0.006 | 0.021 | 0.032 |

In accordance with Table 1, comparing with the arrangement A including a conventional back light and a conventional color filter with the arrangement B including the back light BL1 of the present invention and the conventional color filter, the color reappearance area has been greatly improved 87% from 72%. Also, the green chromatic coordinates has changed to (0.280, 0.618) from (0.206, 0.648), therefore, the green color becomes more genuine green color in terms of the hue and the chroma. However, the change of the chromaticity by the difference of a viewing angle becomes larger. For instance at the viewing angle of 60°, the value of du'v' becomes larger to du'v'=0.038 from du'v'=0.031. This occurred as a result of a reduced maximum intensity of the green wavelength of 517 nm from 545 nm in order to obtain the genuine green color for a back light spectrum, and the liquid crystal panel received larger spectrum difference by a change of viewing angle, as shown in FIG. 12.

On the other hand, according to the back light BL1 and an arrangement C with the color filter CF1 in Embodiment 1, the color reappearance area becomes much larger, and the green chromatic coordinates is (0.207, 0.712), which indicates the green color becomes more genuine in terms of the hue and chroma. In addition, the change in the chromaticity at the viewing angle of 60° is du'v'=0.032 and it does not hardly deteriorate compared with the conventional composition. This is because even though the wavelength of the green component for the back light is reduced, a component below 500 nm of the green color filter is also reduced, therefore, it is hard to receive an effect of a large spectrum change from the viewing angle of the liquid crystal panel.

As shown in the liquid crystal display device in Embodiment 1, in addition to the achievement of the larger color reappearance display area, it is possible to display the genuine green color in terms of the hue and the chroma, while controlling the displacement of a white chromaticity caused by changes of viewing angle.

Embodiment 2

Figure 2:
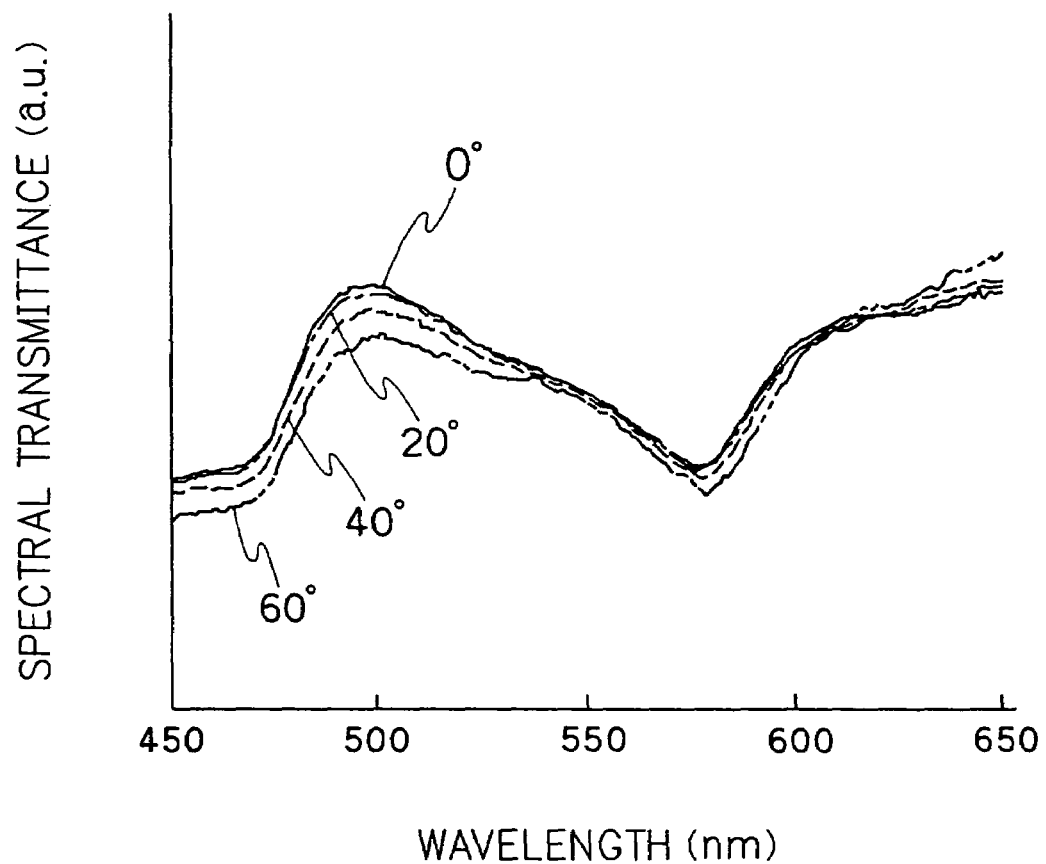
FIG. 2 shows a characteristic diagram of a dependent viewing angle of the transmit spectrum for a liquid crystal display panel of the liquid crystal display in accordance with Embodiment 2 of the present invention.
Figure 3:
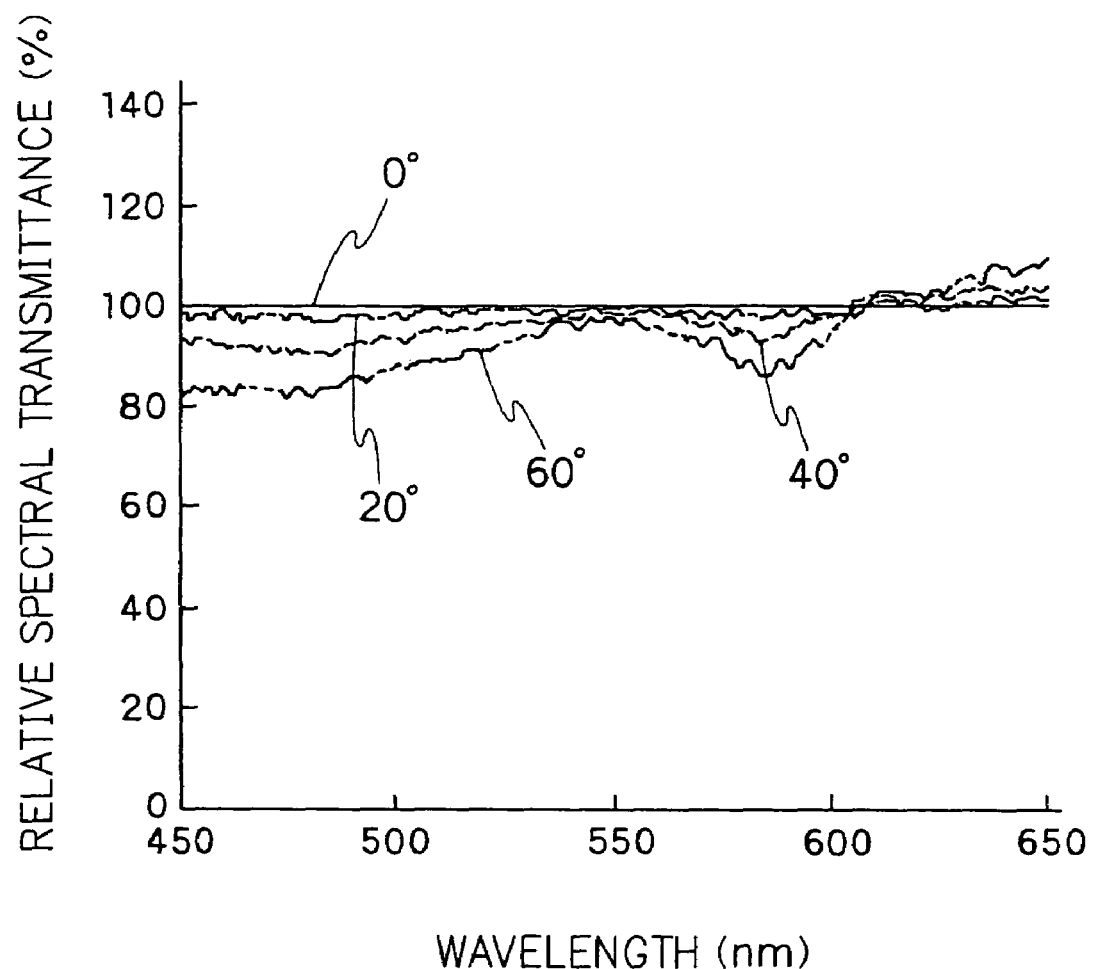
FIG. 3 shows a standardized spectrum from a front in terms of each viewing angle of a transmit spectrum.

The liquid crystal display as disclosed in Embodiment 2 is composed of the back light BL1 having the same characteristic of a spectrum and a color filter CF1 as shown in Embodiment 1 and the liquid crystal display panel having a dependent viewing angle of the transmit spectrum as shown in FIG. 2. The viewing angle in FIG. 2 is an angle expressed by a left and right polar angle, as a normal angle in the liquid crystal display is set as 0°. FIG. 3 is a standardized transmit spectrum from each angle of FIG. 2 by spectrum of front direction, and when the change of the viewing angle is between 0° and 60°, a relative change of the transmit spectrum is within 20% of difference. For the liquid crystal display having a transmit spectrum such as in FIGS. 2 and 3, there is employed an IPS mode in which through an electrode located under a substrate, the lateral electric field is applied, then liquid crystal molecules are rotated parallel to the substrate.

In Table 2, there is shown a test result of a chromatic coordinates of a displayed green picture, a range of color reappearance and a test result of a chromaticity displacement of a white chromaticity of arrangement D. As shown in Table 2, according to Embodiment 2, the color reappearance area is 96% and the green chromatic coordinates is (0.205, 0.708), and this shows almost the same characteristic of color purity as shown in previous Embodiment 1. Also, change of the chromaticity at the viewing angle of 60° is du'v'=0.012, and it has been improved greatly compared with Embodiment 1 and conventional examples.

In Embodiment 2, with respect to the liquid crystal display panel, there is employed the IPS mode in which through an electrode located under a substrate, the lateral electric field is applied, then liquid crystal molecules are rotated parallel to the substrate. However, any liquid crystal panel can be used as long as it meets a requirement in which a wavelength has a range of 500 nm to 600 nm, the relative change of the transmit spectrum is within 20% of difference from the front position between the viewing angle of 0° and 60° of the transmit spectrum. For example, either a vertical alignment mode, which is a mode while aligning liquid crystal molecules vertically to two glass substrates, alignment of the liquid crystal molecule is controlled through applied voltage between the two glass substrates, or an optically self-compensated birefringence (OCB) mode, which is a mode while bent aligned molecules are located between the two glass substrates and alignment of the liquid crystal molecules is controlled through applied voltage between above-mentioned two glass substrates, can be employed.

TABLE 2

| Arrangement | Backlight | Color filter | Liquid crystal mode | Green chromatic coordinates | | Color reappearance area Gamut | Change of white chromaticity by viewing angle [du'v'] | | |
|---|---|---|---|---|---|---|---|---|---|
| | | | | x | y | | 20° | 40° | 60° |
| D | BL1 | CF1 | IPS | 0.205 | 0.708 | 96% | 0.002 | 0.005 | 0.012 |

Embodiment 3

Figure 4:
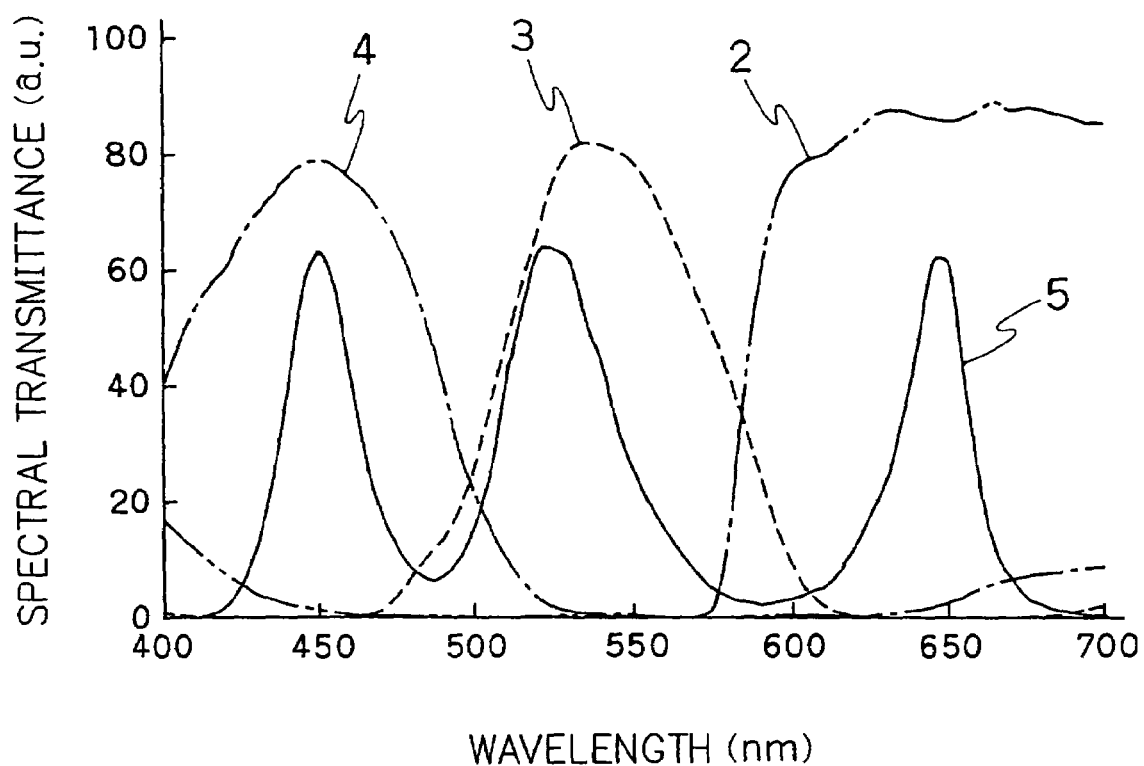
FIG. 4 shows a characteristic diagram of the light emitting spectrum of the back light and the transmit spectrum of the color filter which compose the liquid crystal display in accordance with Embodiment 3 of the present invention.
Figure 5:
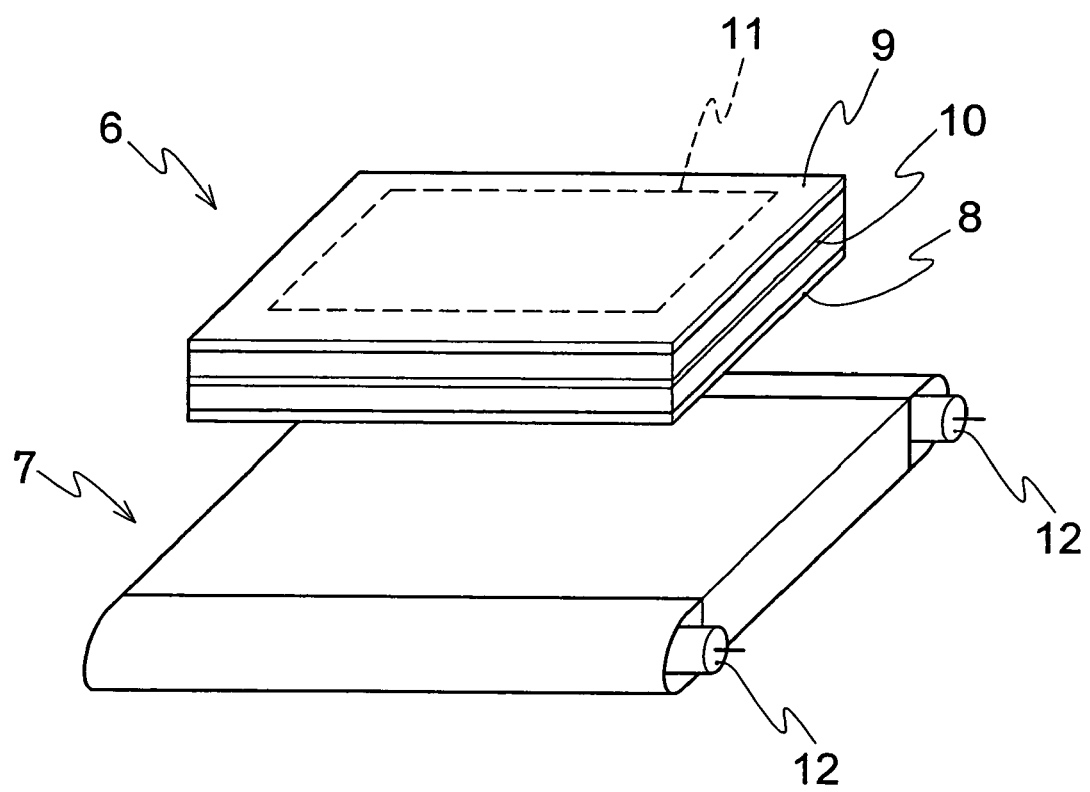
FIG. 5 shows an exploded perspective view showing a schematic construction of the liquid crystal display for the presented invention and conventional products.
Figure 6:
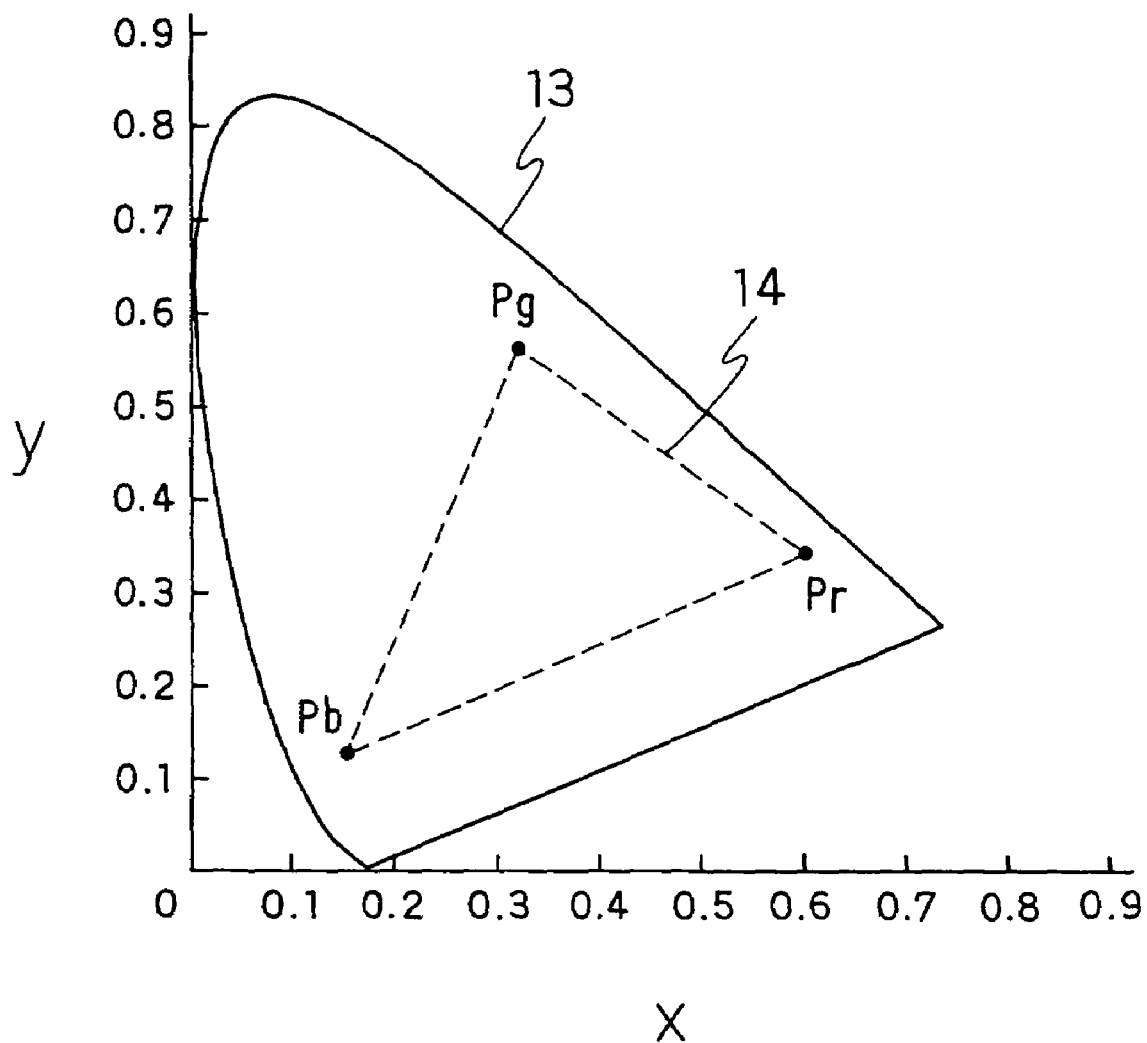
FIG. 6 shows the CIE chromaticity coordinates, which explains the color reappearance area of a general liquid display.
Figure 7:
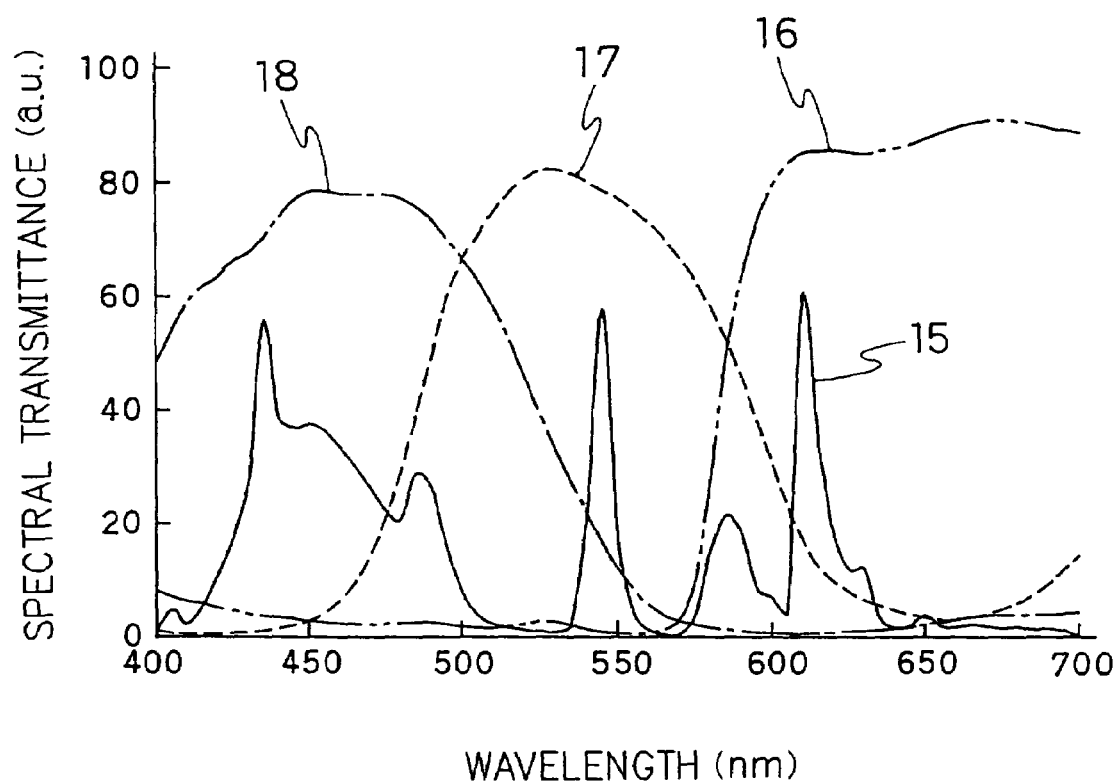
FIG. 7 shows a characteristic diagram of the light emitting spectrum of the back light and the transmit spectrum of the color filter which consist of the conventional liquid crystal display.
Figure 8:
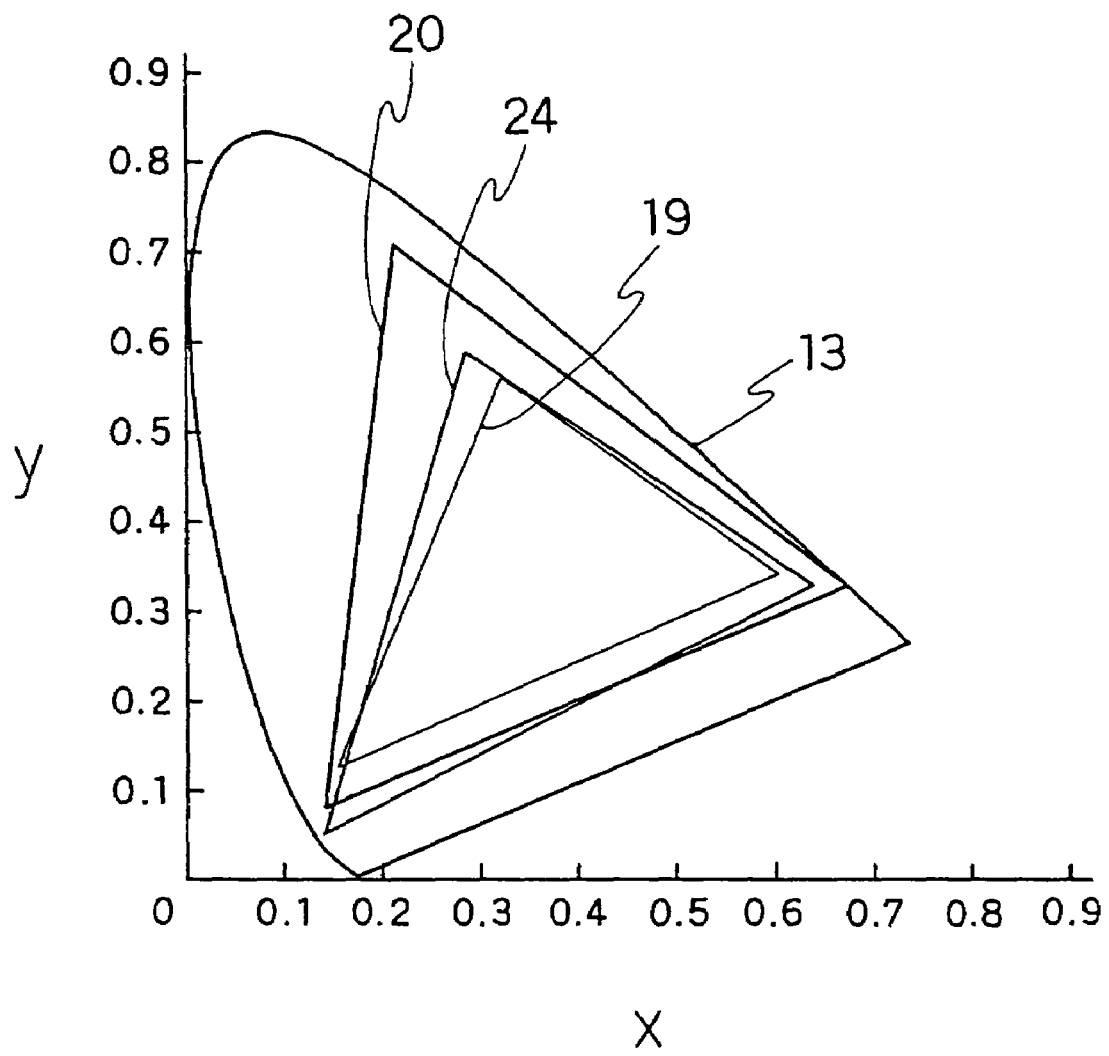
FIG. 8 shows the CIE chromaticity coordinates, which explains the color reappearance area of the conventional liquid crystal display.

FIG. 4 shows a characteristic of a light emitting spectrum 5 of the back light BL2 and a transmit spectrum of a color filter CF1 in Embodiment 3 of the present invention. The color filter CF1 is the same device employed in previous Embodiments 1 and 2, and the same TN-type liquid crystal display panel being employed in Embodiment 1 is employed as a liquid crystal display panel.

On the other hand, as a light source of the back light, a maximum intensity of the light emitting spectrum of 525 nm at a range of 500 nm to 550 nm of the light emitting spectrum in a green component is used. As the light source, for instance, there can be employed a green light emitting diode (LED) having the same kind of spectrum characteristic. Other than the green LED, white light, a mixture of three light colors of a red LED, blue LED and green LED, can be used. The number of LED is decided to obtain a desirable white chromaticity according to a characteristic of each LED.

In Table 3, there is shown a test result of a chromatic coordinates of a displayed green picture, a range of color reappearance and a test result of a chromaticity displacement of a white chromaticity of an arrangement F. In accordance with Embodiment 3 in Table 3, the color reappearance area is 117%, the green chromatic coordinates is (0.174, 0.761), and this shows more genuine green in terms of the hue and chroma. On the other hand, a chroma change at a viewing angle of 60° is du'v'=0.035 and it is slightly larger. However, compared with the liquid crystal display in an arrangement E, which employs the same light source and the conventional color filter, the change of the viewing angle has been reduced.

In Embodiment 3, the red LED, the green LED and the blue LED are employed as the light source, however, an LED, which emits three-color light or a white LED can be employed.

TABLE 3

| Arrangement | Backlight | Color filter | Liquid crystal mode | Green chromatic coordinates | | Color reappearance area Gamut | Change of white chromaticity by viewing angle [du'v'] | | |
|---|---|---|---|---|---|---|---|---|---|
| | | | | x | y | | 20° | 40° | 60° |
| E | BL2 | conventional | TN | 0.173 | 0.715 | 110% | 0.007 | 0.024 | 0.040 |
| F | BL2 | CF1 | TN | 0.174 | 0.761 | 117% | 0.007 | 0.023 | 0.035 |

Embodiment 4

In Embodiment 4 of the present invention, as same as previous Embodiment 3, the back light BL2 having a light emitting spectrum 5 and the color filter CF1 having the characteristic of the transmit spectrum are employed as shown in FIG. 4. In terms of the liquid crystal panel, as same as previous Embodiment 2, a change of the viewing angle between 0° and 60° is relatively within 20% from the front direction in a range of a wavelength of 500 nm to 600 nm as shown in FIGS. 2 and 3.

In Embodiment 4, the LED is employed as the light source of the back light as same as Embodiment 3, and the in plane switching mode, in which through an electrode located under a substrate, the lateral electric field is applied, then liquid crystal molecules are rotated parallel to the substrate, is employed as the liquid crystal display panel as same as Embodiment 2.

In Table 4, there is shown a test result of a chromatic coordinates of a displayed green picture, a range of color reappearance and a test result of a chromaticity displacement of a white chromaticity of an arrangement G. According to Table 4 of Embodiment 4, a color reappearance area is 115%, a green chromatic coordinates is (0.179, 0.757), and it shows almost the same result as shown in Embodiment 3. The chroma change at the viewing angle of 60° is du'v'=0.014 and improved greatly compared with the conventional examples or an arrangement F as shown in Embodiment 3.

TABLE 4

| Arrangement | Backlight | Color filter | Liquid crystal mode | Green chromatic coordinates | | Color reappearance area Gamut | Change of white chromaticity by viewing angle [du'v'] | | |
|---|---|---|---|---|---|---|---|---|---|
| | | | | x | y | | 20° | 40° | 60° |
| G | BL2 | CF1 | IPS | 0.176 | 0.759 | 115% | 0.002 | 0.006 | 0.015 |

In Embodiment 1, 2, 3 and 4, a cold cathode fluorescent lamp or an LED is employed as a light source. However, a light source having a maximum intensity of the light emitting spectrum is in a range of 510 nm to 530 nm, and preferably, 510 nm to 520 nm within a wavelength range 500 nm to 550 m can be employed. For instance, thermal cathode fluorescent light, electroluminescence (EL) or fluorescent display tube (VFD) can be employed.

What is claimed is:

1. A liquid crystal display device comprising:

a light source;

a back light controlling a luminous intensity distribution from said light source; and a liquid crystal display comprising liquid crystal display panel, wherein said liquid crystal display panel is provided in a light emitting side of said back light and controls a transmission rate from said back light, wherein a maximum intensity of a light emitting spectrum of said back light is in a range of 510 nm to 530 nm in a wavelength range of 500 nm to 550 nm, wherein said liquid crystal panel comprises a red color filter, which transmits red components, a green color filter, which transmits green components and a blue color filter, which transmits blue components, and a transmit spectrum of said green color filter comprises a half value of a maximum transmitting rate of 500 nm to 590 nm in a wavelength range, and wherein the liquid crystal display device has a color reappearance area between 96% to 117% and a change of white chromaticity between 0.012 to 0.035 at a viewing angle of 60°.

2. A liquid crystal display device comprising:

a light source;

a back light controlling a luminous intensity distribution of light from said light source; and a liquid crystal display comprising liquid crystal display panel, wherein said liquid crystal panel is provided in a light emitting side and controls a transmission rate from said back light, wherein a maximum intensity of a light emitting spectrum of said back light is in a range of 510 nm to 520 nm in a wavelength range of 500 nm to 550 nm, wherein said liquid crystal panel comprises a red color filter which transmits red components, a green color filter which transmits green components and a blue color filter which transmits blue components, and a transmit spectrum of said green color filter comprises a half value of a maximum transmitting rate of 500 nm to 590 nm in a wavelength range, and wherein the liquid crystal display device has a color reappearance area between 96% to 117% and a change of white chromaticity between 0.012 to 0.035 at a viewing angle of 60°.

3. The liquid crystal display device of claim 1, wherein in said liquid crystal panel has a relative change of the transmit spectrum within 20% from front direction, between a viewing angle change of 0° and 60° in a wavelength range of 500 nm to 600 nm.

4. The liquid crystal display device of claim 2, wherein in said liquid crystal panel has a relative change of the transmit spectrum within 20% from front direction, between a viewing angle change of 0° and 60° in a wavelength range of 500 nm to 600 nm.

5. The liquid crystal display device of claim 3, wherein in said liquid crystal display panel controls a transmittance through applying a lateral electric field to liquid crystal by an electrode being located under a substrate and parallel rotates liquid crystal molecules on the substrate.

6. The liquid crystal display device of claim 4, wherein in said liquid crystal display panel controls a transmittance through applying a lateral electric field to liquid crystal by an electrode being located under a substrate and parallel rotates liquid crystal molecules on the substrate.

7. The liquid crystal display device of claim 1, wherein said liquid crystal display comprises the light source in said back light; said light source being a cold cathode tube.

8. The liquid crystal display device of claim 2, wherein said liquid crystal display comprises the light source in said back light; said light source being a cold cathode tube.

9. The liquid crystal display device of claim 1, wherein said liquid crystal display comprises the light source in said back light; said light source being a light emitting diode.

10. The liquid crystal display device of claim 2, wherein said liquid crystal display comprises the light source in said back light; said light source being a light emitting diode.

11. The liquid crystal display device of claim 3, wherein said liquid crystal display panel employs a vertical alignment mode while aligning liquid crystal molecule vertically to the two glass substrates, alignment of the liquid crystal molecules is controlled through applied voltage between said two glass substrates.

12. The liquid crystal display device of claim 4, wherein said liquid crystal display panel employs a vertical alignment mode while aligning liquid crystal molecule vertically to the two glass substrates, alignment of the liquid crystal molecules is controlled through applied voltage between said two glass substrates.

13. The liquid crystal display panel of claim 3, wherein said liquid crystal display employs optically compensated birefringence mode while bent aligned molecules being between the two glass substrates, alignment of the liquid crystal molecules is controlled through applied voltage between said two glass substrates.

14. The liquid crystal display panel of claim 4, wherein said liquid crystal display employs optically compensated birefringence mode while bent aligned molecules being between the two glass substrates, alignment of the liquid crystal molecules is controlled through applied voltage between said two glass substrates.

15. The liquid crystal display device of claim 1, wherein the light source of said back light is a thermal cathode tube.

16. The liquid crystal display device of claim 2, wherein the light source of said back light is a thermal cathode tube.

17. The liquid crystal display device of claim 1, wherein the light source of said back light is an electroluminescence.

18. The liquid crystal display device of claim 2, wherein the light source of said back light is an electroluminescence.

19. The liquid crystal display device of claim 1, wherein the light source of said back light is a fluorescent display tube.

20. The liquid crystal display device of claim 2, wherein the light source of said back light is a fluorescent display tube.

* * * * *